US010643142B2

(12) United States Patent
Wan et al.

(10) Patent No.: US 10,643,142 B2
(45) Date of Patent: May 5, 2020

(54) SEARCH TERM PREDICTION (71) Applicant: TARGET BRANDS, INC., Minneapolis, MN (US)

(72) Inventors: Howard Wan, Waltham, MA (US); Priyabrata Kuanr, Bangalore (IN); Nikhil Bansal, Bangalore (IN)

(73) Assignee: TARGET BRANDS INC., Minneapolis, MN (US)

( * ) Notice: Subject to any disclaimer, the term of this patent is extended or adjusted under 35 U.S.C. 154(b) by 255 days.

(21) Appl. No.: 15/226,187

(22) Filed: Aug. 2, 2016

(65) Prior Publication Data

US 2018/0039699 A1 Feb. 8, 2018

(51) Int. Cl.
*G06N 7/00* (2006.01)
*G06F 16/332* (2019.01)
*G06N 20/00* (2019.01)

(52) U.S. Cl.
CPC ......... *G06N 7/005* (2013.01); *G06F 16/3322* (2019.01); *G06N 20/00* (2019.01)

(58) Field of Classification Search
CPC .. G06F 17/30; G06F 17/3064; G06F 16/3322; G06N 7/00; G06N 7/005; G06N 20/00
See application file for complete search history.

(56) References Cited

U.S. PATENT DOCUMENTS

| | | | | |
|---|---|---|---|---|
| 8,645,825 B1* | 2/2014 | Cornea | ............... | G06F 17/3064 715/257 |
| 9,135,559 B1* | 9/2015 | Chan | ..................... | G06F 16/248 |
| 10,169,711 B1* | 1/2019 | Dean | ....................... | G06N 7/005 |
| 2005/0283468 A1* | 12/2005 | Kamvar | ............... | G06F 17/3064 |
| 2008/0120294 A1* | 5/2008 | Davis | ....................... | G06Q 30/02 |
| 2011/0295824 A1* | 12/2011 | Schneider | ................ | G06N 5/04 707/706 |
| 2012/0124071 A1* | 5/2012 | Gebhard | ............. | G06F 17/3097 707/767 |
| 2012/0269116 A1* | 10/2012 | Xing | .................... | G06F 16/3322 370/328 |
| 2014/0122503 A1* | 5/2014 | Smith | ................ | G06Q 30/0201 707/748 |
| 2014/0181100 A1* | 6/2014 | Ramer | .................... | H04L 67/22 707/728 |

(Continued)

*Primary Examiner* — Tarek Chbouki
*Assistant Examiner* — Maher N Algibhah
(74) *Attorney, Agent, or Firm* — Hamre, Schumann, Mueller & Larson, P.C.

(57) ABSTRACT

A system and computer-implemented method for predicting a search term of a search are disclosed. The method includes building, by a server, a search prediction dictionary database, the search prediction dictionary database including a plurality of search terms and a plurality of prediction scores corresponding to the plurality of search terms; receiving, by the server, one or more characters from a user device over a network, the one or more characters corresponding to the search; identifying, by the server, one or more predicted search terms based on the one or more characters, the identifying including determining one or more of the plurality of search terms including the one or more characters; and providing, by the server, a search term prediction list including the one or more predicted search terms to the user device for display on a display device of the user device.

18 Claims, 5 Drawing Sheets

(56) References Cited

U.S. PATENT DOCUMENTS

| | | | |
|---|---|---|---|
| 2014/0280000 A1* | 9/2014 | Subramanian Karthik | G06F 16/90324 707/706 |
| 2015/0120386 A1* | 4/2015 | Sherman | G06Q 30/0202 705/7.31 |
| 2015/0339754 A1* | 11/2015 | Bloem | G06Q 30/0631 705/26.7 |
| 2016/0005098 A1* | 1/2016 | Flynn | G06Q 30/0631 705/26.7 |
| 2016/0019213 A1* | 1/2016 | Carmel | G06F 16/951 707/728 |
| 2016/0188708 A1* | 6/2016 | Glover | G06F 16/9535 707/722 |
| 2016/0321727 A1* | 11/2016 | Levin | G06F 16/2457 |
| 2016/0328787 A1* | 11/2016 | Szulczewski | G06Q 30/0201 |
| 2017/0185670 A1* | 6/2017 | Dua | G06F 17/241 |
| 2017/0308557 A1* | 10/2017 | Cassidy | G06F 17/30303 |

* cited by examiner

SEARCH TERM PREDICTION

FIELD

This disclosure relates generally to electronic search processing. More specifically, the disclosure relates to systems and methods for predicting a search term based on a portion of the search term when processing an electronic search.

BACKGROUND

Consumers purchase products in retail stores and via retail websites accessible from the Internet. Shopping via a retail website allows consumers to interact with text, pictures, videos, and/or audio clips relating to the products the consumer is contemplating purchasing. Often, shopping via the retail website allows the consumer to read reviews by other consumers, search for related products, and search for products that other consumers bought at the same time, or the like. In some instances, the inventory of products available from a retailer through the retail website can be different from the products available at the retail store.

Improved ways to enhance a consumer's shopping experience are desirable.

SUMMARY

This disclosure relates generally to electronic search processing. More specifically, the disclosure relates to systems and methods for predicting a search term based on a portion of the search term when processing an electronic search.

In an embodiment, a search term prediction can be based on a search prediction dictionary database. The search prediction dictionary database can, for example, be based on clickstream data from a recent period of time. In an embodiment, the recent period of time can be at or about six months. In an embodiment, the recent period of time can be less than or greater than six months. Selection of the period of time can be based on, for example, an amount of clickstream data available over the period of time.

In an embodiment, the search prediction dictionary database can include one or more searches and an associated prediction score for the one or more searches. In an embodiment, the search prediction dictionary database can be ordered based on, for example, the associated prediction scores.

In an embodiment, the prediction score can be based on a hierarchy for a particular set of actions as a result of the search. For example, if a visitor of a website adds an item to her cart following a search, the prediction score for that search might be higher than a prediction score for a search in which the visitor only clicks on a particular item. In an embodiment, an add to cart action may be weighted higher than a click action, and the click action may be weighted higher than a search action.

In an embodiment, searches which are determined to be junk searches (e.g., special characters are present in the search, etc.) may be filtered/removed from the search prediction dictionary database.

In an embodiment, the search term prediction can include a spelling correction feature. For example, if the visitor enters a search as "greeeen" the search term prediction can be based on the visitor having entered "green."

In an embodiment, the search term prediction may be based on a visitor's context information. For example, the search term prediction may be based on the visitor's browsing history, queries in a current browsing session, queries in previous browsing sessions, or the like.

In an embodiment, a search term prediction system can be used to predict a search term for a search based on one or more characters received from a search input of the retail website.

In an embodiment, the search term prediction system can provide one or more predicted search terms. In an embodiment, the search term prediction system can provide a particular number of predicted search terms, such as, but not limited to 10 predicted search terms. In an embodiment, the search term prediction system can provide no predicted search terms if the number of predicted search terms is less than a minimum number. In an embodiment, if the number of predicted search terms is greater than the minimum number, the search term prediction system can provide all predicted search terms.

A computer-implemented method for predicting a search term of a search is also disclosed. The method includes building, by a server, a search prediction dictionary database, the search prediction dictionary database including a plurality of search terms and a plurality of prediction scores corresponding to the plurality of search terms; receiving, by the server, one or more characters from a user device over a network, the one or more characters corresponding to the search; identifying, by the server, one or more predicted search terms based on the one or more characters, the identifying including determining one or more of the plurality of search terms including the one or more characters; and providing, by the server, a search term prediction list including the one or more predicted search terms to the user device for display on a display device of the user device.

A system for predicting a search term is also disclosed. The system includes a server that includes a search prediction dictionary builder that generates a search prediction dictionary database that stores one or more keywords associated with one or more prediction scores; a search term predictor that, in response to receiving at least one character of a search input to a user device, identifies one or more predicted keywords from the one or more keywords in the search prediction dictionary database; and the search term predictor that receives the at least one character provides a search term prediction list that includes the one or more predicted keywords.

A search term prediction system is also disclosed. The search term prediction system includes search prediction dictionary building means that generates a search prediction dictionary database that stores one or more keywords associated with one or more prediction scores; prediction means that identifies one or more predicted search terms from the one or more keywords in the search prediction dictionary database based on at least one character received from an input means of a user device, and that generates a search term prediction list including the one or more predicted search terms and is able to communicate with the user device to send the search term prediction list to the user device for viewing the search term prediction list.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

This disclosure relates generally to electronic search processing. More specifically, the disclosure relates to systems and methods for predicting a search term based on a portion of the search term when processing an electronic search.

A retail website can include an electronic search engine ("search engine"). A search engine generally refers to a software system that enables electronic searching of information in a particular location such as, but not limited to, the Internet, a database, a plurality of databases, or the like. For example, a search engine for a retail website can be used by a visitor of the retail website to search through an inventory of products that are available from the retailer (e.g., one or more products that are available for purchase via the website, in a retail store of the retailer, or a combination thereof, etc.). When the visitor performs a search using the search engine, the visitor's search is often referred to as the visitor's search or query. The terms of the search may also be referred to as the keywords of the search or query.

The search engine can be a part of an electronic search system ("search system"). The search system can include, for example, a search input (e.g., a text box, etc.) displayed on the retail website, a search term prediction system, and a search engine. The search term prediction system can, in an embodiment, provide a search term prediction list to the visitor via the retail website. The search term prediction system can also include one or more search prediction dictionary databases which can be used to generate the search term prediction list.

A search or search, as used herein, generally includes one or more keywords which are input into a search input of the search engine. In this specification, a search entered by the user may alternatively be referred to as a search entered by the visitor, a visitor's search, or the like.

In a search engine for a retail website (e.g., an e-commerce search engine), a search term prediction system can be used to, for example, predict one or more search terms based on one or more characters input by the visitor of the retail website (e.g., predicting the one or more search terms based on one or more characters input by the visitor). The search term prediction can, for example, reduce an amount of time required by the website visitor to obtain search results when using the search engine of the retail website. In an embodiment, the reduced search time can, for example, lead to a higher rate of visitors whose searches lead to purchasing of one or more products from the retailer. This can be accomplished by identifying one or more search terms in a search prediction dictionary database to form a search prediction list based on the visitor's input search term. For example, if the visitor is searching for "comforter," the search can be entered as "c", "co", "com", etc. The accuracy of the search term prediction list can increase as the visitor enters additional characters.

Clickstream data, as used herein, generally includes a series of selections made by a user when browsing a website or software application.

Figure 1:
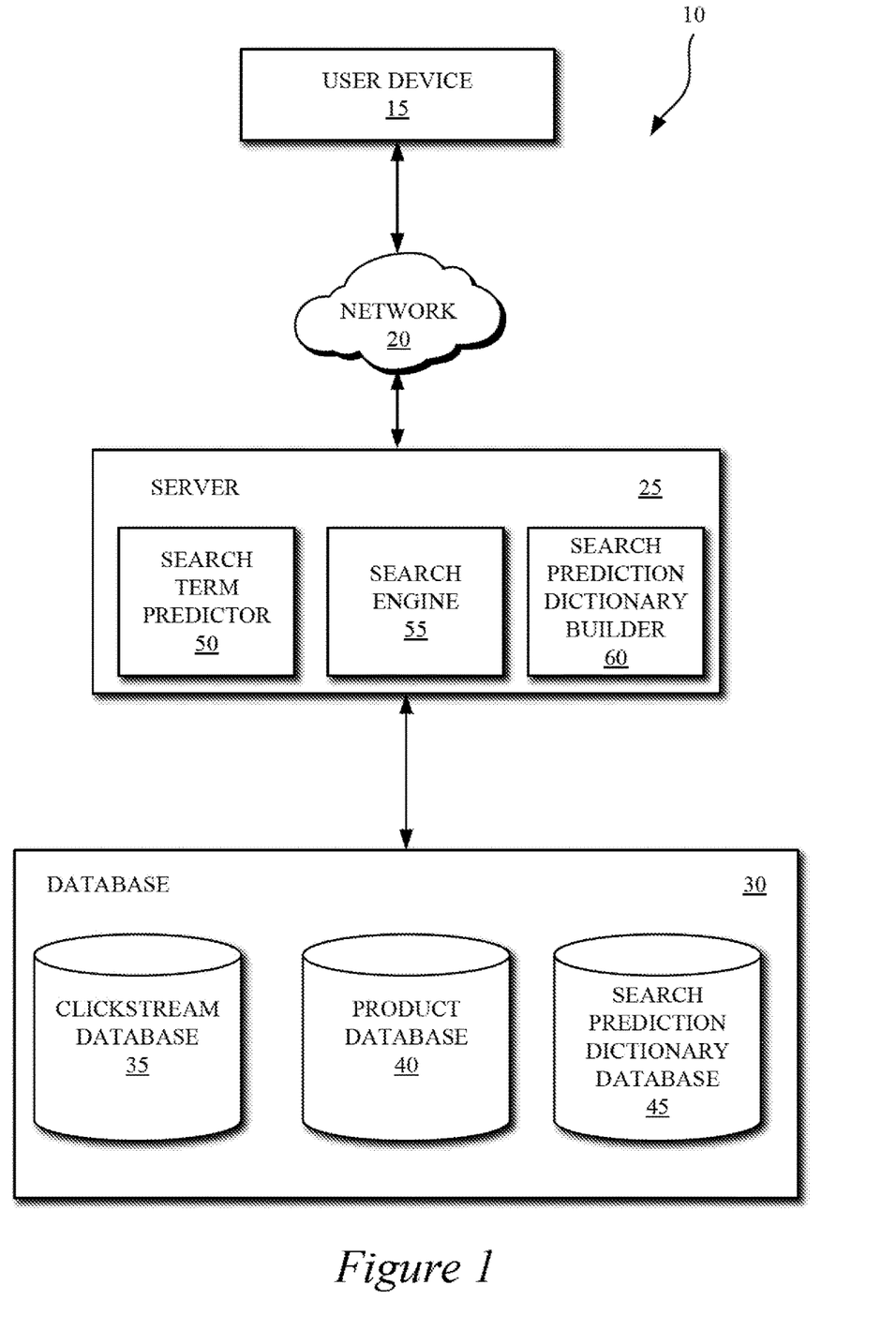
FIG. 1 is a schematic diagram of a search term prediction system, according to an embodiment.

FIG. 1 is a schematic diagram of a system 10 for implementing the search term prediction systems and methods described in this specification, according to an embodiment. The system 10 can be used to build a search prediction dictionary database and to provide a search prediction list based on one or more characters in a search from a visitor of a website (e.g., a retail website of a retailer, etc.).

The system 10 includes a server 25 in communication with a user device 15 via a network 20. The server 25 can make a search prediction list available to the user device 15. The server 25 can make the search prediction list available to the user device 15 via the network 20. In an embodiment, the server 25 can make a graphical user interface (GUI) (not shown) for performing a search of a product database (e.g., product database 40 described below) available from a retailer (e.g., via the retailer's website or via the retailer's store in instances in which the retailer also has a retail store) available to the user device 15 via the network 20 in accordance with generally known principles. It will be appreciated that the GUI may be made available by one or more servers that are separate (not shown) from the server 25. In an embodiment, aspects of the server 25 can be the same as or similar to aspects of the server device 535 as shown and described in accordance with FIG. 5 below.

The network 20 is generally representative of the Internet. In an embodiment, the network 20 can include, for example, a local area network (LAN), a wide area network (WAN), a wireless network, a cellular data network, or the like. In an embodiment, aspects of the network 20 can be the same as or similar to aspects of network 540 as shown and described in accordance with FIG. 5 below.

The visitor can search an inventory of items available for purchase from a retailer (e.g., either from the retailer's website or from the retailer's store) via the user device 15. Examples of the user device 15 include, but are not limited to, a personal computer (PC), a laptop computer, a mobile device (e.g., a smartphone, a personal digital assistant (PDA), a tablet-style device, etc.), a wearable mobile device (e.g., a smart watch, head wearable device, etc.), or the like. The user device 15 generally includes a display device and an input device. A GUI for searching the inventory of items sold by the retailer can be displayed on the display device of the user device 15. Examples of the display device for the user device 15 include, but are not limited to, a monitor connected to a PC, a laptop screen, a mobile device screen, a tablet screen, or the like. In an embodiment, aspects of the user device 15 can be the same as or similar to aspects of user devices 501 as shown and described in accordance with FIG. 5 below.

The server 25 is in communication with a database 30. The database 30 generally includes a variety of information on click and sales data from a retailer, such as the clickstream database 35. The click and sales data can include, for example, a listing of searches performed by visitors of the website, along with clicks the visitors performed in response to those searches (e.g., which products the visitors clicked on from the search results, etc.), whether the visitors added any products from the search results to a shopping cart for purchase, and which product(s) the visitors ultimately added to the shopping cart for purchase. The clickstream database 35 can include click and sales data for a particular period of time. For example, in an embodiment, the clickstream database 35 can include click and sales data for the previous calendar year. The amount of click and sales data in the clickstream database 35 can vary. It will be appreciated that the amount of click and sales data can contribute to an accuracy of a search term predictor 50 (described in additional detail below). The clickstream database 35 can be updated automatically such that data for the particular period of time is included in the clickstream database 35, and older data (e.g., older than the selected period of time) may not be included in the clickstream database 35. The frequency at which the clickstream database 35 is updated can vary such that the clickstream database 35 can include entries for a period of time that is less than or greater than the previous calendar year. The clickstream database 35 can include a large number of entries, and accordingly, can be time consuming to build, which may determine the frequency at which the clickstream database 35 is updated.

The database 30 can include a variety of information on products available from the retailer, such as product database 40. In an embodiment, the products included in the product database 40 may be those products that are available from the retailer, including products that are available through the retailer's website or in a retail store of the retailer.

The database 30 further includes a search prediction dictionary database 45. The search prediction dictionary database 45 can store a listing of keywords and a search prediction score associated with each of the keywords.

The database 30 can include additional information such as, but not limited to, a user history database, a session history database, or the like. It will be appreciated that the databases 35-45 can alternatively be combined and that a structure of the database 30 is not intended to be limited to the illustrated embodiment. In an embodiment, the search prediction dictionary database 45 may be created, for example, based on information that is available in the clickstream database 35 and/or the product database 40.

The server 25 includes prediction means (a search term predictor 50), a search engine 55, and a search prediction dictionary builder 60. In an embodiment, the prediction means includes a prediction scoring means that generates the one or more prediction scores based on search and click data stored in a clickstream database. It will be appreciated that the server 25 can include fewer or additional aspects. For example, the server 25 can additionally include a GUI builder (not shown). In an embodiment, the server 25 can additionally include one or more search pre-processing features, such as, but not limited to, a search classifier.

The system 10 includes a search prediction dictionary building means such as the search prediction dictionary builder 60. The search prediction dictionary builder 60 can, for example, use information from the database 30 to build the search prediction dictionary database 45, according to an embodiment. The building of the search prediction dictionary database 45 is discussed in additional detail in accordance with FIG. 2 below.

For example, the search prediction dictionary builder 60 can extract data from the clickstream database 35 and provide a prediction score based on, for example, clicks and conversions (e.g., cart adds (e.g., when an item is added to an electronic shopping cart), purchases, etc.) for a particular search term. For example, in an embodiment, a search term can be "comforter" and a prediction score can be associated with the search term depending on how many times the search term (1) is received by the search engine 55, (2) results in an item selection from a results set based on the search term, and (3) results in the visitor adding one or more items to her cart.

The search prediction dictionary builder 60 can build the search prediction dictionary database 45 on a periodic basis. For example, the search prediction dictionary builder 60 can extract data and categorize the data on a weekly basis, daily basis, hourly basis, etc. In an embodiment a weekly basis may be preferred to provide a sufficient amount of data to inform the prediction score that is not too expansive as computing the prediction score takes processing time which is increased as the amount of data increases.

The search engine 55 can be used to determine search results for a particular search. The search engine 55 can be provided with the visitor's search in the same manner as the search was input. For example, if a visitor searches for "green apples," the search engine 55 may be provided with a search "green apples" and return all products satisfying the search as a search results list.

Figure 2:
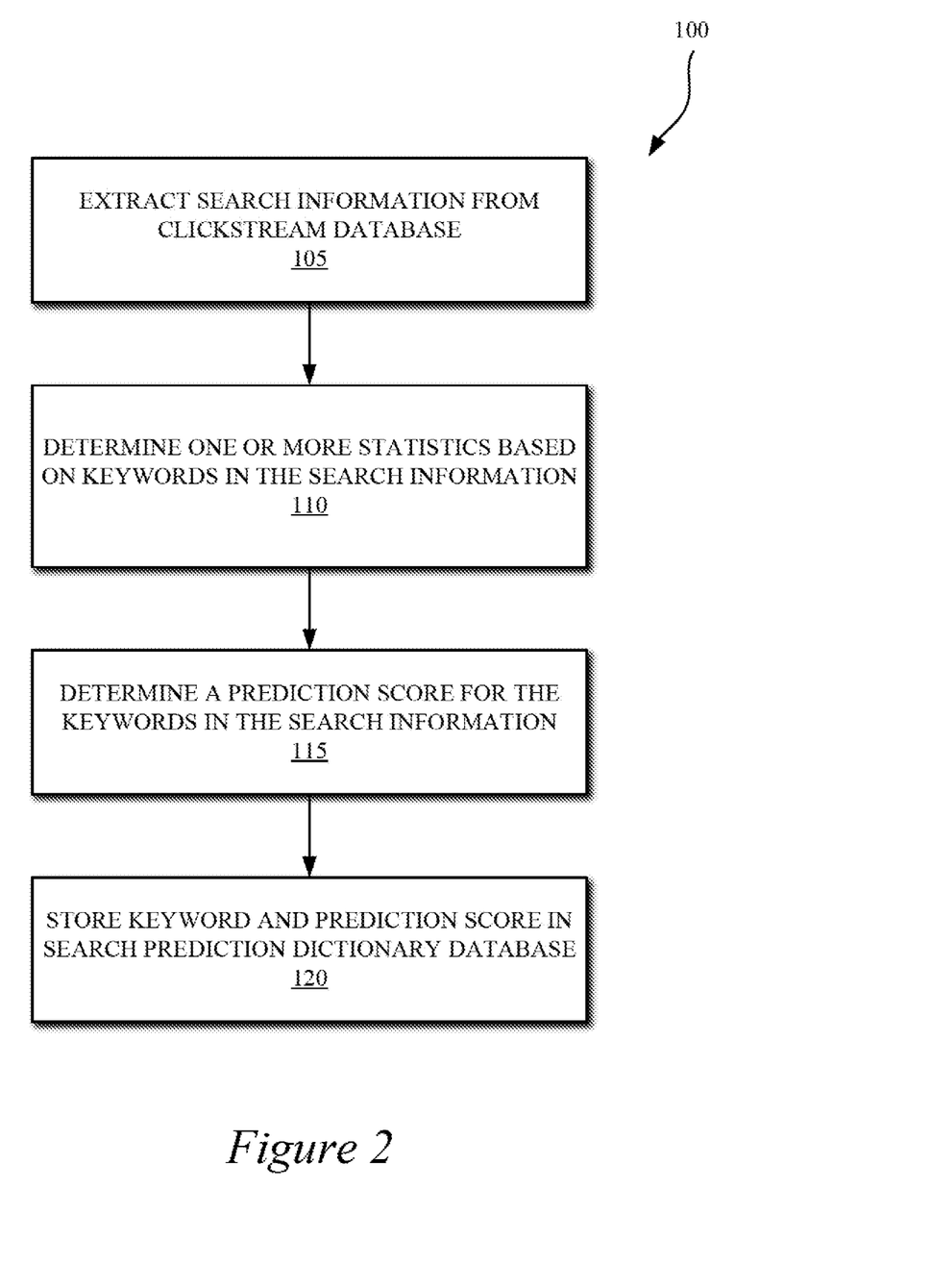
FIG. 2 illustrates a method for preparing the search prediction dictionary database, according to an embodiment.

FIG. 2 illustrates a method 100 for preparing the search prediction dictionary database 45 (FIG. 1), according to an embodiment. The method 100 generally corresponds to a process in which the search prediction dictionary database 45 is built. In an embodiment, the method 100 can provide the search prediction dictionary database 45 which can in turn be used by the search term predictor 50 (FIG. 1) to provide a search prediction list for display to the visitor via the display device of the user device 15 (FIG. 1).

At 105, the server 25 (e.g., the search prediction dictionary builder 60) (FIG. 1) extracts search information from the clickstream database 35. In an embodiment, the search prediction dictionary builder 60 can extract a subset of the data that is stored in the clickstream database 35. For example, in an embodiment in which the clickstream database 35 includes search information for the past one year, the search prediction dictionary builder 60 can extract search information from the clickstream database 35 from a period of time that is less than one year. In an embodiment, the search prediction dictionary builder 60 can extract search information from the clickstream database 35 for a period of time that includes the previous 180 days (e.g., six months). It will be appreciated that the period of time can vary beyond the stated value. For example, in an embodiment the period of time can be less than six months, while in another embodiment, the period of time can be greater than six months.

At 110, one or more statistics corresponding to the searches as extracted from the clickstream database 35 are computed. In an embodiment, computing one or more statistics can include determining a count of actions corresponding to each search in the clickstream database 35. For example, the search prediction dictionary builder 60 can count each occurrence of a particular search in the clickstream database 35. More particularly, the search prediction dictionary builder 60 can count each action associated with an occurrence of the particular search. For example, if a search is "comforter," the search prediction dictionary builder 60 can identify (1) how many times the search comforter was entered, (2) how many times an item was selected from the search results when the search comforter was entered (e.g., identify a number of times the search resulted in a click action by the visitor), and (3) how many times the visitor added an item to her cart when the search comforter was entered.

At 115 a prediction score is determined for each keyword. The prediction score can be based on a weighting system depending on, for example, actions taken by the visitors having input the particular keyword. For example, in an embodiment, a cart add action can have a greater weight than a search click, and the search click can have a greater weight than the search entry. In an embodiment, the actions taken can be weighted based on timing within the clickstream data. For example, actions taken more recently may be given a higher weight in determining the prediction score, while actions taken less recently may be given a lower weight in determining the prediction score. In an embodiment, the prediction score can also be weighted based on a length of the keyword as compared to a length of a subset of characters of the keyword. For example, the keyword "comforter" can be split into a variety of character combinations "c," "co," "com," "comf," etc.

At 120, a keyword and associated prediction score is stored in the search prediction dictionary database 45. The keyword and associated prediction score can be ordered from highest score to lowest score, according to an embodiment. In an embodiment, the keywords can be ordered alphabetically first, and by prediction score second. Accordingly, when a character is received from the visitor, the search term predictor 50 can identify one or more search terms to provide to the visitor.

Figure 3:
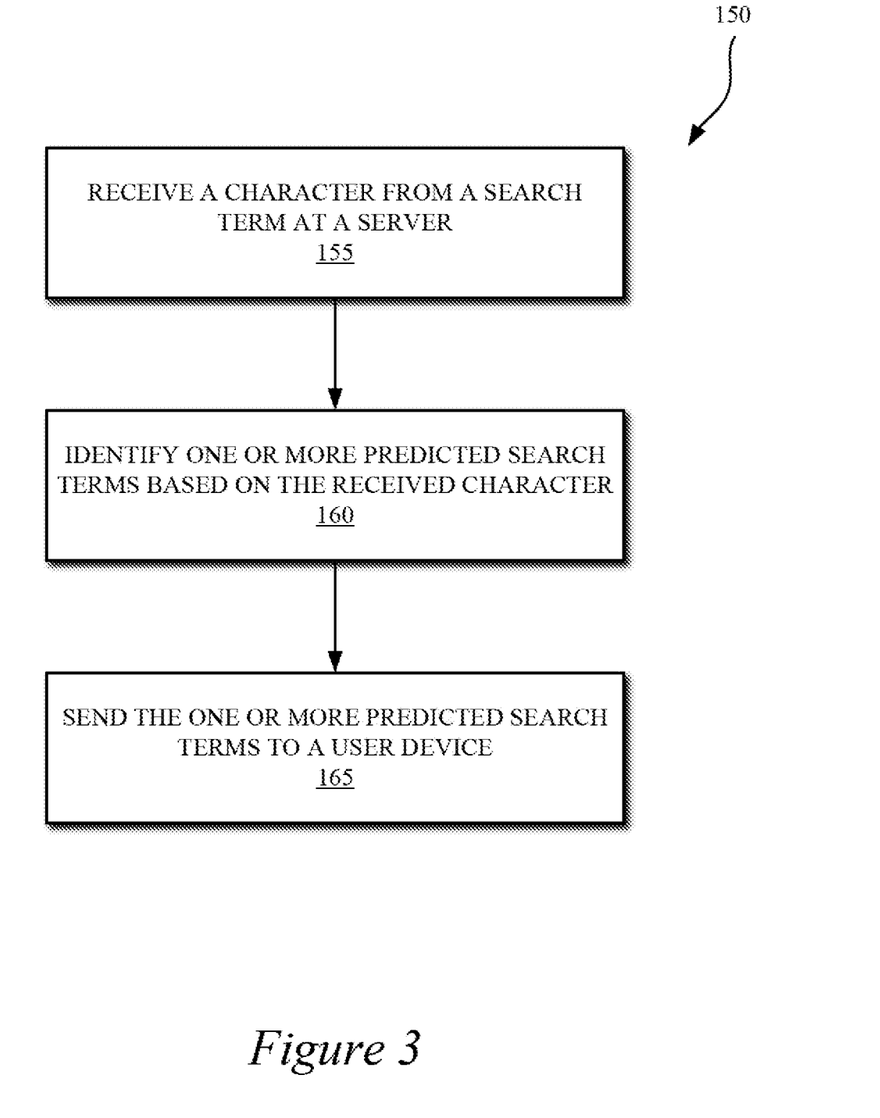
FIG. 3 illustrates a method for processing a search, including providing a search term prediction list, according to an embodiment.

FIG. 3 illustrates a method 150 for processing a search, including providing a search term prediction list, according to an embodiment. The method 150 generally includes receiving a search keyword (e.g., one or more characters) from a visitor of a website and provides a search prediction list.

At 155, the server 25 (e.g., the search term predictor 50) (FIG. 1) receives a character from a keyword input on the input device (input means) of the user device 15 (FIG. 1). In response to receiving to the character, the search term predictor 50 predicts one or more search terms based on the received character at 160.

At 160, the search term predictor 50 searches the search prediction dictionary database 45 for keywords based on the received character. For example, if the visitor enters a "c" the search term predictor 50 identifies one or more search terms that begin with "c," according to an embodiment. The search term predictor 50 can select one or more search terms that begin with "c" to be included in the search prediction list for display on the display device of the user device 15. For example, in an embodiment, the search term predictor 50 may select 10 terms beginning with "c" that have the highest prediction scores for inclusion in the search prediction list. It will be appreciated that the number of terms is illustrative and can be varied. As the visitor enters additional characters, the search term predictor 50 modifies the string of characters to be matched, and accordingly, may modify the search prediction list. In an embodiment, the search term predictor 50 can identify search terms based on matching the character string regardless of the location within the keyword. For example, if the visitor enters "tall" the search term predictor 50 may identify one or more search terms that begin with "tall" such as "tall pants," and may also identify one or more search terms in which "tall" is not the first word, such as "big and tall." In an embodiment, the search term predictor 50 may also correct for spelling errors. For example, if the visitor enters "comfforter" the search term predictor 50 can identify one or more search terms that include "comforter."

At 165, the search term predictor 50 sends the one or more predicted search terms in the search prediction list to the user device 15. In an embodiment, if the search prediction list does not include a minimum number of search predictions (e.g., at least two search predictions, etc.), the search prediction list may not be provided to the user device 15.

Figure 4:
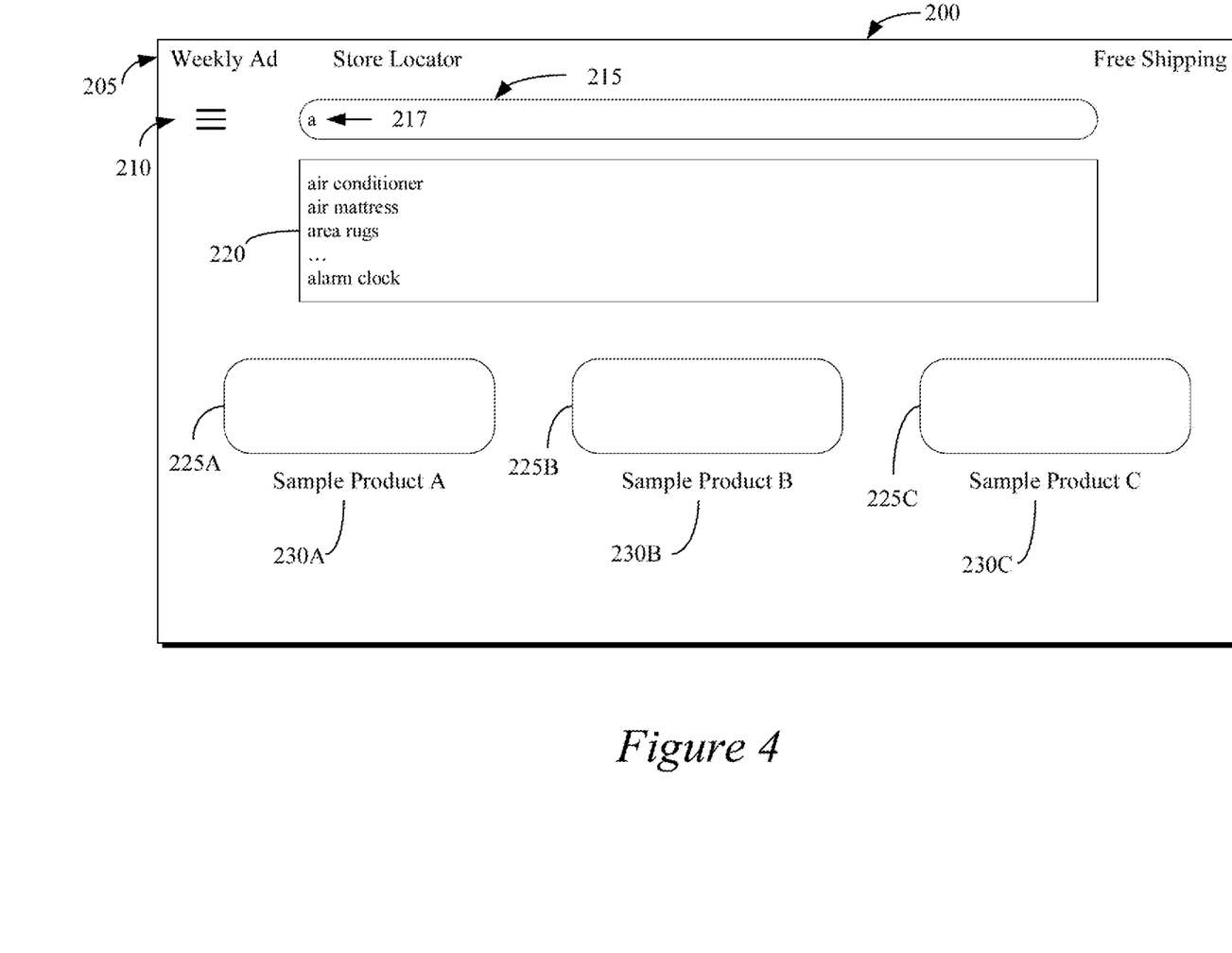
FIG. 4 illustrates a graphical user interface of a retail website displaying a search term prediction list as described herein, according to an embodiment.

FIG. 4 illustrates a graphical user interface (GUI) 200 of a retail website displaying a search term prediction list 220 as described herein, according to an embodiment. The GUI 200 is an example of the retail website and can include additional or less information than shown in FIG. 4. It will be appreciated that the text is representative and can be modified.

The GUI 200 includes a header 205, a menu 210, a search input 215, a search term 217, a search prediction list 220, a plurality of products 225A-225C and product labels 230A-230C.

The header 205 can, for example, include one or more hyperlinks or other text which a user can click to navigate to different pages of the retail website, according to an embodiment. In an embodiment, the header 205 can include one or more promotional messages such as, but not limited to, "Free Shipping," or the like. The menu 210 can be a clickable image which in response to being selected can display a list of options to the user. For example, clicking on the menu 210 can cause a number of categories (e.g., electronics, houseware, clothing, etc.) to display, navigational options, or the like.

The search input 215 is an input into which a user can input a search term. In the illustrated embodiment, a search term 217 including the character "a" has been input for illustrative purposes. The search term 217 is accordingly one character in the illustrated embodiment. In accordance with the principles described above, the search term prediction list 220 is displayed in response to the entry of the search term 217. It will be appreciated that the particular items within the search term prediction list 220 are illustrative and are not intended to be limiting.

The GUI 200 also includes a plurality of products 225A-225C and product labels 230A-230C which are generally representative of products available for purchase from the retailer (either via the website or in the retail store). In an embodiment, the products 225A-225C and product labels 230A-230C can alternatively be categories of products. It will be appreciated that the products 225A-225C and product labels 230A-230C are examples, and that fewer or additional products, as well as additional content may be included in the GUI 200. For example, in an embodiment, the GUI 200 can include a footer having one or more hyperlinks selectable by the user to, for example, navigate to different interfaces of the retail website.

Figure 5:
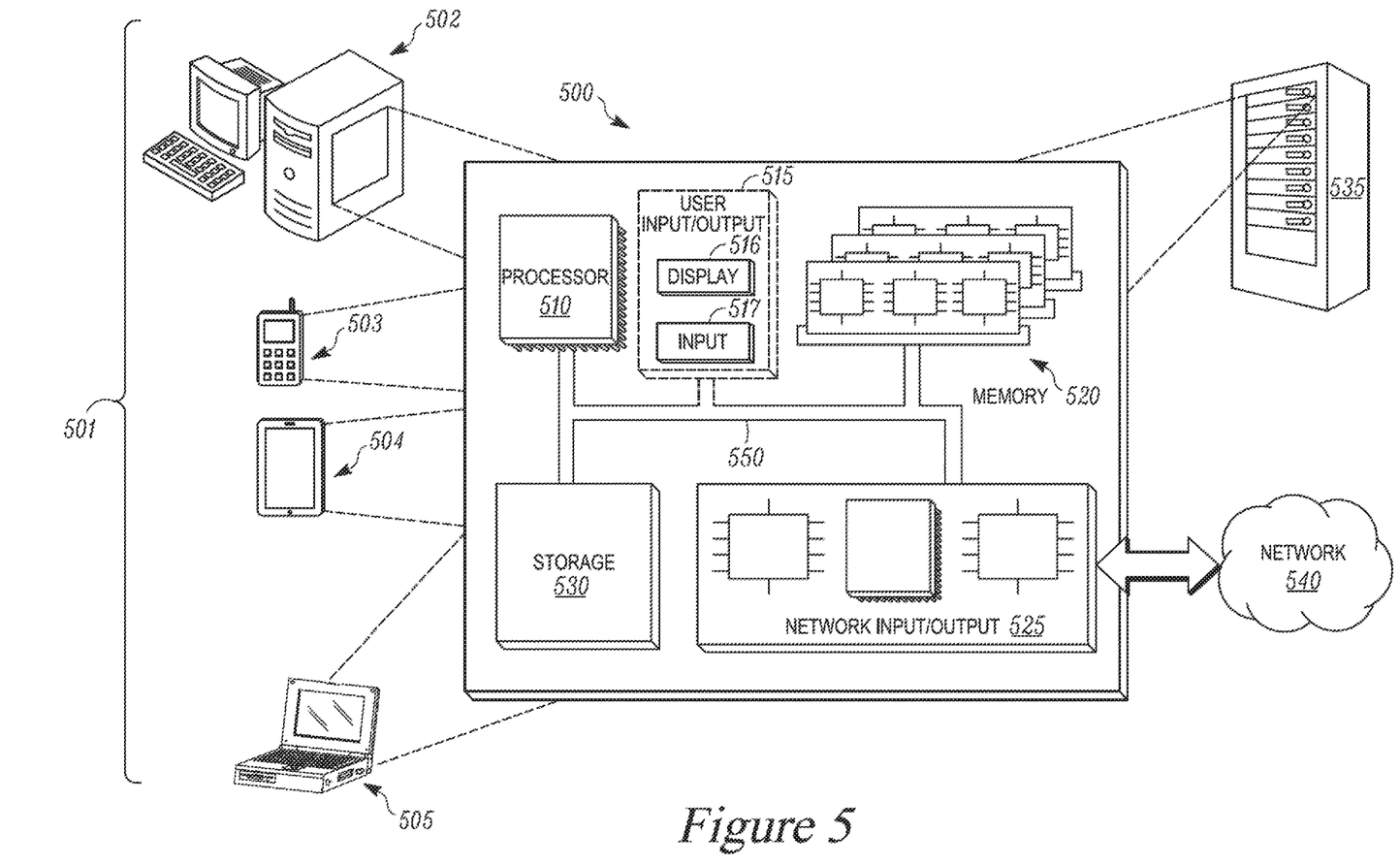
FIG. 5 is a schematic diagram of an architecture for a computer device, according to an embodiment.

FIG. 5 is a schematic diagram of an architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a personal digital assistant (PDA), a video game console, a television, or the like. In some embodiments, the user devices 501 can alternatively be referred to as client devices 501. In such embodiments, the client devices 501 can be in communication with the server device 535 through the network 540. One or more of the client devices 501 can be in communication with another of the client devices 501 through the network 540 in some embodiments.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can, for example, be one or more busses or the like. The processor 510 can be a single processor, multiple processors, or a single processor having multiple processing cores. In some embodiments, the processor 510 can be a single-threaded processor. In some embodiments, the processor 510 can be a multi-threaded processor.

The user I/O 515 can include a display 516 and/or an input 517, according to some embodiments. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In some embodiments, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In some embodiments, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or input means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using WiFi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary.

What is claimed is:

1. A computer-implemented method for predicting a search term of a search in a retail environment, the method comprising:

building, by a server, a search prediction dictionary database, the search prediction dictionary database including a plurality of search terms and a plurality of prediction scores corresponding to the plurality of search terms, the building including:

retrieving click and sales data including search history data from a clickstream database, wherein the clickstream database is updated automatically such that older click and sales data that is older than a selected period of time is removed from the clickstream database and newer click and sales data that is within the selected period of time remains in the clickstream database;

creating the plurality of prediction scores using the search history data retrieved for the plurality of search terms, wherein the plurality of prediction scores are determined for each of the plurality of search terms based on a set of actions taken as a result of searches for the respective search term, the set of actions including a number of times the respective search term was searched, a click action in search results returned for the respective search term, an add to shopping cart action for an item in the search results returned for the respective search term, and a purchase action for an item in the search results returned for the respective term, wherein the purchase action is weighted greater than the add to shopping cart action, the add to shopping cart action is weighted greater than the click action, and the click action is weighted greater than the number of times the respective search term was searched, and actions from the set of actions taken more recently are given a greater weight than action from the set of actions taken less recently;

removing one or more searches in the search history data including special characters from the search history data; and ordering the plurality of search terms within the search prediction dictionary database according to the plurality of prediction scores; identifying, by the server, one or more predicted search terms based on the one or more characters, the identifying including determining one or more of the plurality of search terms including the one or more characters; and providing, by the server, a search term prediction list including the one or more predicted search terms to the user device for display on a display device of the user device.

2. The computer-implemented method according to claim 1, wherein providing the search term prediction list includes sending the search term prediction list to the user device over a network.

3. The computer-implemented method according to claim 1, further comprising providing the search term prediction list when the search term prediction list includes more than a threshold number of search terms.

4. The computer-implemented method according to claim 1, further comprising correcting a spelling of the one or more characters when more than one character are received.

5. The computer-implemented method according to claim 1, wherein identifying the one or more predicted search terms includes using one or more previously submitted search terms identified from context information associated with the user device instead of the one or more search terms in the search prediction dictionary database.

6. The computer-implemented method according to claim 1, wherein identifying the one or more predicted search terms includes identifying search terms including the one or more characters, wherein the search terms include the one or more characters in a location other than a beginning of the one or more search terms.

7. The computer-implemented method according to claim 1, wherein the plurality of prediction scores are further determined based on one or more of a browsing history of the user device, one or more queries in the current browsing session of the user device, or one or more queries in previous browsing sessions of the user device.

8. The computer-implemented method according to claim 1, wherein the plurality of prediction scores are further determined based on a length of the search term compared to a length of a subset of characters of the search term.

9. The computer-implemented method according to claim 1, wherein the one or more predicted search terms are selected based on matching the one or more characters regardless of location within the one or more predicted search terms.

10. The computer-implemented method according to claim 1, wherein each of the plurality of prediction scores are further weighted based on a comparison between a length of the one or more characters provided by the user device and a length of a subset of characters of a predicted search term.

11. A system for predicting a search term in a retail environment, comprising:

a server that includes:
one or more processors; and
a memory storing instructions that, when executed by the one or more processors, cause the system to perform:
a search prediction dictionary builder that generates a search prediction dictionary database that stores one or more keywords each associated with one or more prediction scores, including:
retrieving click and sales data including search history data from a clickstream database, wherein the clickstream database is updated automatically such that older click and sales data that is older than a selected period of time is removed from the clickstream database and newer click and sales data that is within the selected period of time remains in the clickstream database;

creating the plurality of prediction scores using the search history data retrieved for the plurality of search terms, wherein the plurality of prediction scores are determined for each of the plurality of search terms based on a set of actions taken as a result of the searches for the respective search term, the set of actions including a number of times the respective search term was searched, a click action in search results returned for the respective search term, an add to shopping cart action for an item in the search results returned for the respective search term, and a purchase action for an item in the search results returned for the respective term, wherein the purchase action is weighted greater than the add to shopping cart action, the add to shopping cart action is weighted greater than the click action, and the click action is weighted greater than the number of times the respective search term was searched, and actions from the set of actions taken more recently are given a greater weight than action from the set of actions taken less recently;

removing one or more searches in the search history data including special characters from the search history data; and ordering the plurality of search terms within the search prediction dictionary database according to the plurality of prediction scores; the search term predictor that receives the at least one character provides a search term prediction list that includes the one or more predicted keywords.

12. The system according to claim 11, wherein the server is connectable to a user device over a network, the user device including a display device and an input device, and the server can receive the at least one character from the user device.

13. The system according to claim 11, wherein the server is connectable to a user device over a network and the server can send the search term prediction list to the user device for display on a display device of the user device.

14. The system according to claim 11, wherein the one or more predicted keywords include the at least one character in a location other than a beginning of the one or more keywords in the search prediction dictionary database.

15. The system according to claim 11, wherein the plurality of prediction scores are further determined based on one or more of a browsing history of the user device, one or more queries in the current browsing session of the user device, or one or more queries in previous browsing sessions of the user device.

16. The system according to claim 11, wherein the plurality of prediction scores are further determined based on a length of the search term compared to a length of a subset of characters of the search term.

17. The system according to claim 11, wherein the one or more predicted search terms are selected based on matching the one or more characters regardless of location within the one or more predicted search terms.

18. The system according to claim 11, wherein each of the plurality of prediction scores are further weighted based on a comparison between a length of the one or more characters provided by the user device and a length of a subset of characters of a predicted search term.

* * * * *